United States Patent [19]

Carlson

[11] 4,240,607
[45] Dec. 23, 1980

[54] TOP OPERATED TANK CAR LADING VALVE ALSO OPERABLE FROM THE BOTTOM

[75] Inventor: Edwin S. Carlson, St. Charles, Mo.

[73] Assignee: ACF Industries, Incorporated, New York, N.Y.

[21] Appl. No.: 969,523

[22] Filed: Dec. 14, 1978

[51] Int. Cl.³ .......................... F16K 27/03; F16K 1/48
[52] U.S. Cl. .................................... 251/144; 137/327; 251/289
[58] Field of Search ................ 251/144, 289; 137/327, 137/347, 350

[56] References Cited

U.S. PATENT DOCUMENTS

| | | | |
|---|---|---|---|
| 1,135,254 | 4/1915 | Bloxham | 251/144 |
| 1,736,843 | 11/1929 | Benson | 251/289 X |
| 1,827,911 | 10/1931 | Root, Jr. | 251/225 X |
| 1,890,247 | 12/1932 | Dietrich | 251/144 X |
| 2,139,280 | 12/1938 | McBride | 251/144 X |
| 3,981,481 | 9/1976 | Reedy et al. | 137/544 |

*Primary Examiner*—William R. Cline
*Attorney, Agent, or Firm*—Henry W. Cummings

[57] ABSTRACT

In a top operated tank car valve, a mounting flange is welded to an opening in the bottom of the tank. A valve seat is located inboard of, and above the lower surface of, the mounting flange. A vertically extending cage is integrally attached to the mounting flange. A top operator extends to the top of the tank, and a stem is attached to the lower portion of the top operator. The stem extends into an opening in a valve closure plug. A non-round cavity is formed in the bottom of the stem. The closure plug includes a seat which engages the valve seat located within the mounting flange. The closure plug includes a circular guide ring which engages a portion of the vertically extending cage as the closure plug moves between open and closed positions. The closure plug includes a vertical, generally central opening which communicates with the circular head portion of the valve stem. A retainer, held in place with retainer fasteners extending from the bottom of the retainer into the closure plug, holds in place a seal located in a circumferential groove in the closure plug. The retainer includes an extension which extends through the vertical, generally central opening in the closure plug. The retainer fasteners can be removed from the bottom of the car, providing access to the non-round cavity in the valve stem. Thus, the closure plug may be opened from the bottom of the tank with a tool extending through the vertical center opening. Since the valve seat is located within the mounting flange which does not extend more than one (1) inch below the tank bottom, a tank car skid is not needed to comply with AAR regulations concerning projections from the bottom of railway tank cars.

9 Claims, 4 Drawing Figures

TOP OPERATED TANK CAR LADING VALVE ALSO OPERABLE FROM THE BOTTOM

BACKGROUND OF THE INVENTION

Recent Association of American Railroads (AAR) regulations concerning railway tank cars require that projections extending below the tank bottom in excess of one (1) inch must be protected by a skid which adds weight to the car and expense to install.

Many railway tank cars are operated by a rod extending from a lading closure plug in the bottom of the tank upwardly through the tank to a conventional operator located at the top of the tank. However, it would be desirable in some situations to be able to operate the lading closure plug from the bottom of the tank, in addition to normal operation from the top of the tank.

Furthermore, it sometimes is desirable to be able to remove or move the lading closure plug between open and closed positions from the bottom of the tank, without the operator's having to go inside the tank.

SUMMARY OF THE INVENTION

In a top operated tank car valve, a mounting flange is welded to an opening in the bottom of the tank. A valve seat is located inboard of, and above the lower surface of, the mounting flange. A vertically extending cage is integrally attached to the mounting flange, or is formed integral therewith. A top operator extends downwardly from the top of the tank, and a stem is attached to the lower portion of the top operator. The stem extends into a pocket in a valve closure plug. The closure plug includes a closure seat which engages the valve seat located on the mounting flange. The closure plug includes, also, a circular guide ring which engages a portion of the vertically extending cage as the closure plug moves between open and closed positions. A non-round cavity is formed in the bottom of the stem. The closure plug includes a vertical, generally central pocket or opening which communicates with the cavity in the valve stem.

A retainer, held in place with retainer fasteners extending from the bottom of the retainer into the closure plug, holds in place a seal located in a circumferential groove in the closure plug. The retainer includes an extension which extends through the vertical, generally central opening in the closure plug. The retainer fasteners can be removed from the bottom of the car, providing access to the non-round cavity in the valve stem. Thus, the closure plug may be opened from the bottom of the tank with a tool extending through the vertical center opening. Since the valve seat is located within the mounting flange which does not extend more than one (1) inch below the tank bottom, a skid, which adds weight and expense to the tank car, is not needed to comply with AAR regulations concerning tank cars.

The stem is preferably maintained within the closure plug by a pin extending through a second opening in the closure plug which in turn is held in place within the closure plug by the retainer, or by a circular extension on the retainer which engages the non-round cavity of the valve stem. Removal of the retainer also allows the stem to be removed from the closure plug.

The stem is preferably threaded and engages a threaded sleeve located in the valve cage.

The cage preferably includes circumferentially spaced inwardly directed legs which engage the closure plug guide ring as the closure plug is moved between open and closed positions.

THE DRAWINGS

DESCRIPTION OF PREFERRED EMBODIMENTS

Figure 1:
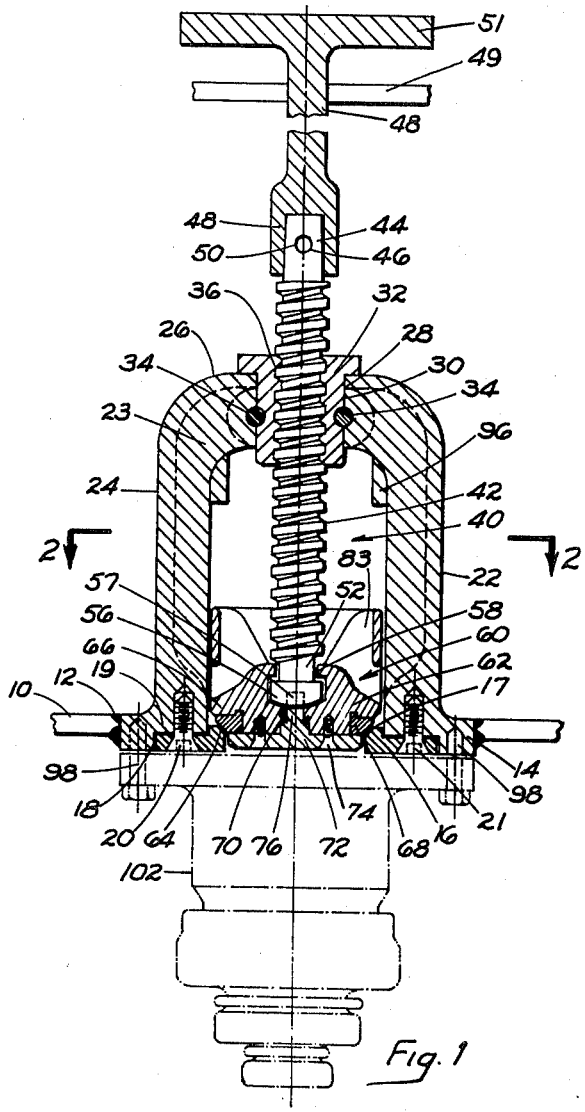
FIG. 1 is a vertical view partly in section of the valve assembly of the present invention looking in the direction of the arrows 1—1 in FIG. 2.

In the drawings a railway tank car bottom 10 is illustrated having an opening 12 into which is welded a tank car mounting flange 14. A valve seat 16 is inserted into a circular cavity 18 in the mounting flange and is held in place by countersunk fasteners 20. Valve seat 16 includes an inclined valve seat surface 17. A gasket 19 is located between mounting flange 14 and valve seat 16. Alternatively, the valve seat may be welded to the mounting flange, or, for new cars, may be formed integrally therewith. Fasteners 20 include non-round openings 21 to receive a non-round tool for removal.

A valve cage 22 may be formed integral with the mounting flange 14, as shown in FIG. 1, or may be attached to the mounting flange 14 by means of the same fasteners 20 which are used to hold the valve seat 16 in place. Valve cage 22 includes four legs 86 spaced approximately 90° apart. A generally "U"-shaped top sleeve support 23 includes a body portion 24 and a top portion 26 having an opening therein 28. Stops 96 are formed in top portion 26.

A sleeve 30, having an upper flange portion 32, is inserted into opening 28 and is held in place with horizontal retaining bolts 34. Sleeve 30 is internally threaded as indicated at 36.

A valve stem indicated generally at 40 includes a threaded portion 42 which in moving between open and closed positions engages threads 36 on sleeve 30. Stem 40 includes a connection portion 44 including an opening 46 to attach the stem to a top rod 48 including a pin 50 passing through the opening 46 and through a top rod 48. Top rod 48 extends to the top 49 of the car and has attached thereto a handle 51 for rotation of rod 48.

Stem 40 further includes an unthreaded portion 52 and a circular head 56 which passes through an opening 58 in a plug closure valve indicated generally at 60. Head 56 includes a hexagon or other non-round cavity 57 in the bottom thereof.

Closure valve plug 60 includes a body portion 62 and an inclined valve seat portion 64 including a slot 66 to receive a seal 68. A center opening 70 is also provided in valve plug 60 and a retainer plate 72, attached to the valve body 62 with fasteners 74, maintains seal 68 in place. Retainer 72 includes an extension 76 within opening 70 to provide part of the bottom support surface for circular head 56 on stem 40. Preferably extension 76 extends within non-round opening 57 in head 56.

Integral with valve plug 60 is a valve plug guide ring indicated generally at 80. The guide ring 80 is formed integral with the valve plug 60 and includes a cylindrical body portion 82 which engages the cage legs 86 as the valve plug 60 moves between open and closed positions.

Figure 3:
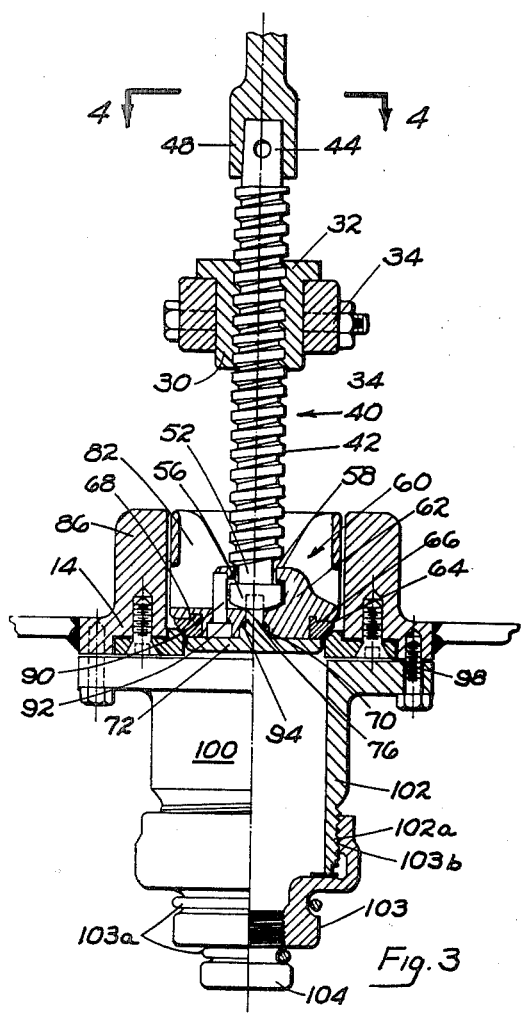
FIG. 3 is a vertical sectional view looking in the direction of the arrows along the line 3—3 in FIG. 2 with the outlet chamber in place.
Figure 2:
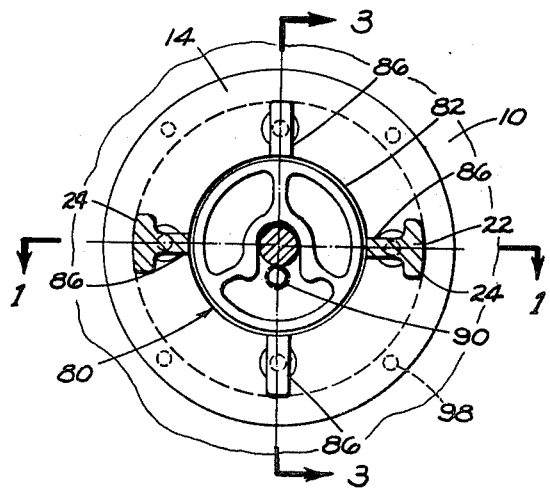
FIG. 2 is a horizontal view partly in section looking in the direction of the arrows along the line 2—2 in FIG. 1.
Figure 4:
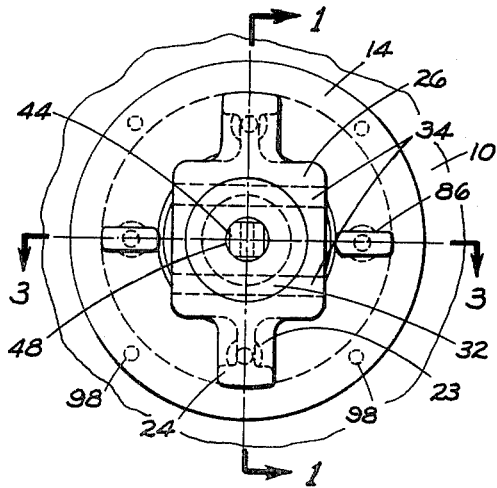
FIG. 4 is a plan view looking in the direction of the arrows along the line 4—4 in FIG. 3.

As shown in FIGS. 2 and 3, retainer plate 72 also holds in place a pin 90 which extends through plug valve 60. The pin 90 prevents removal of the circular stem head 56 from the valve body 62 and holds head 56 in place after assembly. O-ring seals 92 and 94 are provided respectively between the pin 90 and the valve body 62 and between retainer extension 76 and the valve body 62.

An outlet chamber 100 of known construction having an unloading spout 102 and a cap 103 having a retaining chain 103a is held in place with fasteners 98 extending into universal flange 14. Cap 103 is threaded at 103b and engages threads 102a on spout 102. Cap 103 includes a threaded plug 104.

In the operation of the valve assembly of the present invention, to unload the lading, cap 103 is first removed from spout 102, and valve 60 is operated from the top of the tank car by rotating the rod 48 in a conventional manner. This in turn rotates the stem 40 as threads 42 move through the threads 36 and sleeve 30. As a result of the rotation, the valve plug 60 moves upwardly off the seat 17 and travels upwardly as guide ring 80 engages legs 86 of cage 22. In the full open position, top 83 of the guide ring engages the stops 96 on the cage. When the valve plug 60 is off its seat, lading may flow out of the tank.

Rotation of the top rod 48 in the opposite direction will move valve 60 back to the seated position with seal 68 engaging inclined valve seat 17.

From the bottom of the tank, fasteners 98 may be removed to remove outlet chamber 102. Fasteners 74 may be removed which in turn removes retainer plate 72. This provides access through opening 70 to the bottom of stem 56. Thus a tool may be inserted through opening 70 and the valve 60 moves to the open position by engagement of a suitable tool within opening 57 in the stem portion. For example, this is advantageous in an emergency situation when it is not possible to operate the valve from the top of the car. For instance, valve rod 48 may be broken above sleeve 30 or may be disconnected. Also, gasket 19 may be replaced without entering or cleaning the car. In addition, removal of retainer plate 72 also allows removal of pin 92 and thus removal of stem 40 from the plug 60 from the bottom.

Fasteners 98 are of the type which shear off upon impact. Therefore, a protective skid is not required for the outlet chamber. The mounting flange 14 does not extend sufficiently far below the tank bottom 10, in excess of one (1) inch, as to require a skid. The valve seat member 16 is located within the mounting flange and thus a skid is not required to protect the valve seat. Thus the added weight and expense of adding a skid to comply with AAR and DOT regulations concerning tank cars is avoided with the construction of the present invention.

In addition, access to the vertical operator of the outlet is available from the bottom of the car in the event of an emergency situation when it is not possible to operate the lading valve from the top of the car.

What is claimed is:

1. A top operated tank car valve assembly comprising: a mounting flange having a lower surface; said flange welded to an opening in the bottom of the tank; a valve seat located inboard of said mounting flange and above said lower surface; a valve closure plug movable vertically between open and closed positions relative to said seat; a vertically extending cage integrally attached to said mounting flange; said cage having a threaded horizontal portion; a threaded stem located within said cage horizontal portion attached to a top operator extending to the top of the tank; said stem extending within an opening in said valve closure plug; a non-round cavity formed in the bottom of said stem; said closure plug including a closure seat which engages said valve seat; said closure plug including guide means which engage a portion of said cage as the closure plug moves between open and closed positions; said closure plug including a vertical opening which communicates with said non-round cavity and extends to the lower surface of the closure plug; a closure plate located below said closure plug held in place with closure plate fasteners extending from the bottom of the closure plate into said closure plug; said closure plate including an extension which extends through said vertical opening; whereby said closure plate fasteners can be removed from the bottom of the car, providing access to the non-round cavity in the valve stem, and said closure plug may be opened from the bottom of the tank by extending a tool having a non-round portion through said vertical opening which engages said non-round cavity.

2. A tank car valve assembly according to claim 1 wherein said stem is maintained within the closure plug by a pin extending through a second opening in the closure plug; and said pin is supported by said closure plate whereby removal of the closure plate also allows removal of said stem from the closure plug.

3. A tank car assembly according to claim 1 wherein said cage includes circumferentially spaced inwardly directed legs which engage said closure plug guide ring as the closure plug is moved between open and closed positions.

4. A tank car valve assembly according to claim 1 wherein said closure plug includes a circumferential groove and a seal is located in said circumferential groove, held in place by said retainer.

5. A tank car valve assembly according to claim 1 wherein said mounting flange does not extend below said tank bottom more than one (1) inch.

6. A top operated tank car valve assembly comprising: a mounting flange having a lower surface; said flange welded to an opening in the bottom of the tank; a valve seat located inboard of said mounting flange and above said lower surface; a valve closure plug movable vertically between open and closed positions relative to said seat; a vertically extending cage integrally attached to said mounting flange; said cage having a threaded horizontal portion; a threaded stem located within said cage horizontal portion attached to a top operator extending to the top of the tank, said stem extending within an opening in said valve closure; a non-round cavity formed in the bottom of said stem; said closure plug including a closure seat which engages said valve seat; said closure plug including guide means which engages a portion of said cage as the closure plug moves between open and closed positions; said closure plug including a vertical opening which communicates with said non-round cavity and extends to the lower surface of the closure plug; said closure plug including a circumferential groove and a seal located in said circumferential groove; a closure plate located below said closure plug held in place with closure plate fasteners extending from the bottom of the closure plate into said closure plug; said closure plate holding said seal in place; said closure plate including an extension which extends through said vertical opening; whereby said closure plate fasteners can be removed from the bottom of the car, providing access to the non-round cavity in the valve stem, and said closure plug may be opened from the bottom of the tank by extending a tool having a non-round portion through said vertical opening which engages said non-round cavity.

7. A tank car valve assembly according to claim 6 wherein said mounting flange does not extend more than one (1) inch below the tank bottom.

8. A tank car assembly according to claim 7 wherein said cage includes circumferially spaced inwardly directed legs which engage said closure plug guide means as the closure plug is moved between open and closed positions.

9. A tank car assembly according to claim 8 wherein said guide means comprise a guide ring extending upwardly from said closure plug.

* * * * *